United States Patent
Suppes

(10) Patent No.: US 6,574,971 B2
(45) Date of Patent: Jun. 10, 2003

(54) FATTY-ACID THERMAL STORAGE DEVICES, CYCLE, AND CHEMICALS

(76) Inventor: Galen J. Suppes, 4009 Day Flower Ct., Columbia, MO (US) 65203

( * ) Notice: Subject to any disclaimer, the term of this patent is extended or adjusted under 35 U.S.C. 154(b) by 0 days.

(21) Appl. No.: 09/945,682

(22) Filed: Sep. 5, 2001

(65) Prior Publication Data

US 2002/0011587 A1 Jan. 31, 2002

Related U.S. Application Data

(60) Provisional application No. 60/279,100, filed on Mar. 28, 2001, provisional application No. 60/262,397, filed on Jan. 19, 2001, provisional application No. 60/234,605, filed on Sep. 22, 2000, and provisional application No. 60/216,040, filed on Jul. 3, 2000.

(51) Int. Cl.[7] ............................. F25D 17/06; C09K 3/18
(52) U.S. Cl. ............................................. 62/91; 252/70
(58) Field of Search ........................... 62/91, 171, 271, 62/237, 337, 457.1, 530; 252/70

(56) References Cited

U.S. PATENT DOCUMENTS 5,785,884 A * 7/1998 Hammond .................... 252/70
5,976,400 A * 11/1999 Muffett et al. ................ 252/70

* cited by examiner

Primary Examiner—Chen Wen Jiang

(57) ABSTRACT

This invention is a method for producing phase change material (PCM) chemicals containing fatty acids or fatty-acid derivatives. These derivatives (1) are renewable, being produced by biomass or livestock such as cattle, (2) can be manufactured at low to moderate prices, and (3) can be manufactured in a variety of ways to produce PCM chemicals effective at several temperatures of interest in climate control and food maintenance.

Unlike paraffin PCM chemicals that are largely limited to fractions available in either crude oil or irreversible chemical synthesis processes, the ester bond chemistry of triglycerides (fats and oils) is reversible allowing repeated reaction until the desired PCM chemicals combinations are synthesized and isolated. This method in a process based on contacting of reactants, reversible ester bond chemistry, separation of fractions with the desired latent heat properties, and recycle of those fractions that do not have the desired latent heat properties.

14 Claims, 1 Drawing Sheet

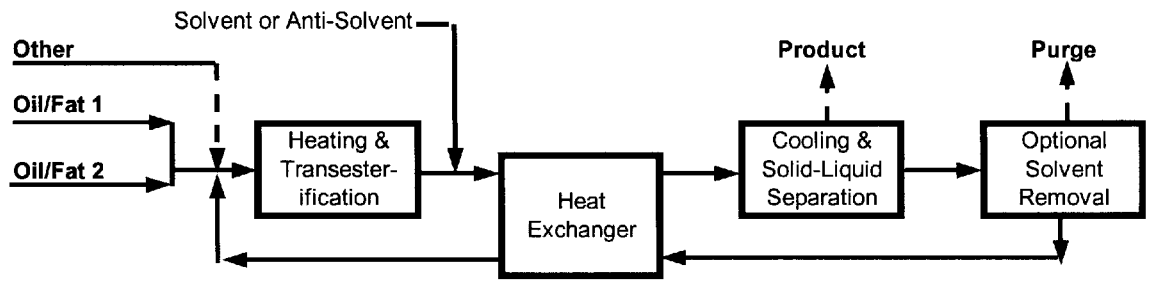

- - - indicates stream is optional, depending on mode of operation
Oil/Fat 1 preferably beef tallow
Oil/Fat 2 preferably soybean oil, rapeseed oil, or yellow grease
Trans-Est Cat. preferably calcium carbonate

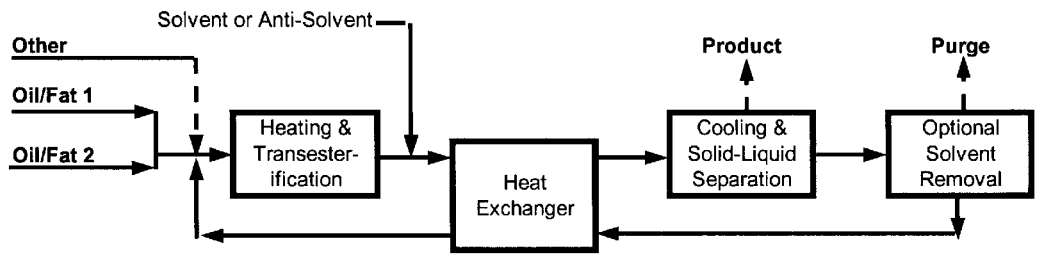

- - - indicates stream is optional, depending on mode of operation
Oil/Fat 1  preferably beef tallow
Oil/Fat 2  preferably soybean oil, rapeseed oil, or yellow grease
Trans-Est Cat.  preferably calcium carbonate

Fig. 1

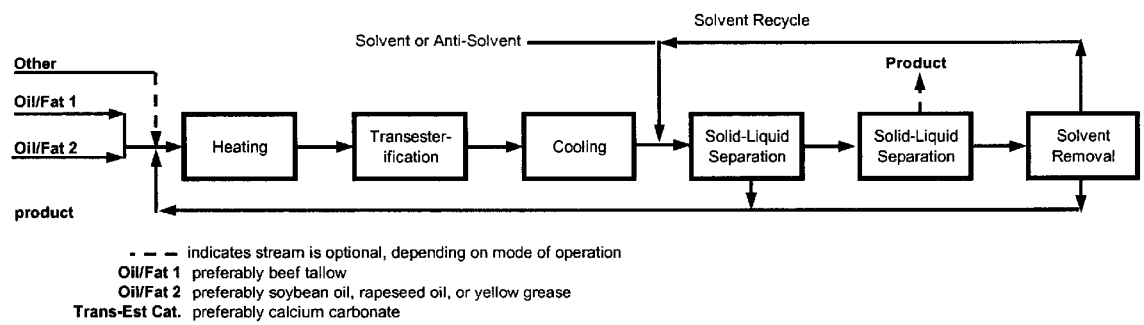

- - - indicates stream is optional, depending on mode of operation
Oil/Fat 1  preferably beef tallow
Oil/Fat 2  preferably soybean oil, rapeseed oil, or yellow grease
Trans-Est Cat.  preferably calcium carbonate

Fig. 2

FATTY-ACID THERMAL STORAGE DEVICES, CYCLE, AND CHEMICALS

CROSS REFERENCE TO RELATED APPLICATION

This nonprovisional application claims benefits of provisional patent application Nos. 60/216,040 filed Jul. 3, 2000, 60/234,605 filed Sep. 22, 2000, 60/262,397 filed Jan. 19, 2001, and 60/279,100 filed Mar. 28, 2001.

BACKGROUND OF THE INVENTION

1. Field of Invention

This invention is on phase change material (PCM) chemicals used in PCM devices to store or remove thermal energy. Applications include (1) walls, flooring, and tank devices used to moderate climates in buildings (2) food storage coolers or other types of coolers, (3) devices used to keep food warm, and (4) essentially any device used to keep a substance at a relatively constant temperature between $-20°$ C. and $150°$ C. More specifically, this invention is on a composition of PCM chemicals largely comprised of fatty acid derivatives, a method for producing these PCM chemicals, and a method for using these PCM chemicals.

2. Description of Prior Art

The term "phase change material" or PCM is known in the science as that class of materials that uses phase changes to absorb or release heat at a relatively constant temperature. Typically the phase changes are fusion (or melting) with an associated latent heat.

Advantages of PCM in climate control include:

1. Eliminating need of air conditioner or heater requirements during substantial portions of the year.
2. Shift electricity usage from prime time to non-prime time.
3. Reducing the size of air conditioners needed to provide cooling requirement.
4. Substantially expanding regions in which heat pumps are practical for heating in wintertime.

Commonly used PCMs include hydrated salts, eutectic salts, and paraffins.

Feldman et al (D. Feldman, D. Banu, D. Hawes. Solar Energy Materials and Solar Cells 36 (1995) 147–157) demonstrated that a mixture of 20% methyl palmitate and 80% methyl stearate provided a sharp solid-liquid phase transition at ambient temperature with a latent enthalpy similar to that of paraffins—this mixture is one of many possible derivatives of fats and oils. Unfortunately, the highly refined methyl palmitate and methyl stearate are too costly to compete with paraffins. This premise provides the motivation for the present invention. The present invention is on a method of producing fat and oil derivatives for use as PCMs and is not limited to any composition. No previous publications or inventions describe a PCM synthesis process similar to this invention. The present invention is also a method for using these PCM chemicals.

Fatty-acid based PCM can be produced in the following categories:

1. Naturally occurring triglycerides,
2. Hydrates of acids of triglycerides and their mixtures,
3. Esters of the fatty acids of naturally occurring triglycerides,
4. Refined/synthesized triglyceride products produced by a combination of fractionation and transesterification processes,
5. Synthesized triglyceride products using hydrogenation (or dehydrogenation) and fractionation,
6. Synthesized triglyceride products using cis-trans isomerization and fractionation,
7. Synthesized fatty acid derivatives that have the desired freezing point temperatures,
8. Refined fatty acid hydrates that have the desired freezing point temperatures, and
9. Prepared mixtures produced by essentially any of the previous processing approaches with other chemicals (preferable cheap and non-toxic) to produce eutectic compositions with the desired freezing point temperature range.

Naturally Occurring Triglyceride PCM

The naturally occurring triglycerides are the least expensive of the categories of fatty-acid based PCM. These are produced by separating natural triglyceride mixtures based on the temperature at which the triglycerides freeze. For example, if a PCM effective at $35°$ C. is desired, the fraction of triglycerides in beef tallow that freezes between $34°$ C. and $36°$ C. is isolated from the mixture of naturally occurring triglycerides.

Preferably separation/fractionation is performed by a filtration or centrifugation process with the triglycerides in a solvent or antisolvent. To achieve the desired fraction, the mixture is filtered/centrifuged at a higher and a lower temperature. The higher temperature will determine the upper temperature of the range of utility of the PCM while the lower filtration/centrifugation temperature will determine the lower temperature of the range of utility of the PCM. If an antisolvent is used, the upper and lower filtration/centrifugation temperatures will be similar to the upper and lower range limits of the PCM. If a solvent is used, freezing point depression will occur and the filtration/centrifugation temperatures will be lower than the range limits of the PCM.

A trial and error procedure can be used to identify the filtration/centrifugation temperatures leading to the desired range limits for the PCM. Optimization routines such as the golden rule method can be used to reduce the number of attempts necessary to identify the correct filtration/centrifugation temperatures. For the golden rule method when used to identify the higher filtration/centrifugation temperature, the dependent variable would be the upper PCM range limit and the independent variable would be the upper filtration/centrifugation temperature. A similar approach would be used to identify the lower PCM range limit. Freezing point depression theory can be used to provide starting points for solvent filtration/centrifugation temperatures. When using antisolvents, high activity coefficients limit the accuracy of freezing point depression theory.

The filtration/centrifugation procedure can be repeated on the filtrate, possibly multiple times, to maximize the amount of latent heat released by the PCM within the temperature range limits. Preferably the solvent or antisolvent is easy to remove from the filtrate PCM. The mass of antisolvent to mass of triglyceride prepared for filtration/centrifugation is preferably between 20:1 and 1:1. Preferred methods of removing the solvent/antisolvent from the PCM are vapor-liquid separation for solvents and liquid—liquid separation for antisolvents.

Alternative to filtration and centrifugation, other separation methods known in the science are also able to achieve the desired separation including but not limited to settling.

If the naturally occurring triglyceride has useful latent heat properties between the desired PCM temperature ranges, further purification/separation is not necessary. When PCM chemicals are prepared with the desired latent heat properties the can be used in PCM devices by methods known in the art.

Alternative to using naturally occurring mixtures of triglycerides, triglycerides such as soybean oil can be hydrogenated to increase the freezing points of those components that react with hydrogen. Possible triglycerides include any commonly available animal fats, animal greases, or vegetable oils.

Hydrates of Acids of Triglyceride and Their Mixtures

Naturally occurring triglycerides come in hundreds of combinations of fatty acids. Hydrolysis processes known in the science can be used to decompose the triglycerides in to glycerin and fatty acids with the variety of fatty acids being significantly less. For example, if a triglyceride contains 20 different types of fatty acids, 20 to the $3^{rd}$ power (8000) different triglycerides can be formed.

By fully hydrolyzing triglycerides and mixture containing far fewer chemical components is formed—it is thus feasible to separate the acids by methods known in the science into essentially pure acids or at least acid mixtures of considerably less variety.

Due to phenomena described by freezing point depression theory, mixtures generally tend to release latent heats over a larger temperature range than pure components with pure components often referred to as having a melting point temperature rather than a melting point temperature range.

The fatty acids or fatty acid mixtures (created by vapor-liquid separation) of a few components can be directly used as PCM chemicals; however, the latent heat temperature ranges are set for the pure fatty acids and may not be in the desired range for the targeted PCM devices.

Fatty acid mixtures can be prepared for targeted temperature ranges by the method previously described for preparing triglyceride-based PCM chemicals.

Alternatively, for fatty acids, two other approaches are viable including (1) correlating vapor liquid separation temperatures with PCM chemical limit ranges and (2) adding water to fatty acids or fatty acid mixtures to form hydrates that would freeze at a relatively narrow temperature range that is different than that of the anhydrous fatty acids. A trial and error approach will work with these approaches to expand the number of useful temperature ranges for latent heat removal.

Unfortunately, even with these degrees of freedom, only a limited number of useful PCM chemical temperature ranges can be achieved. Furthermore, only a small fraction of the acid mixtures will be used in these products.

Esters of the Fatty Acids of Naturally Occurring Triglycerides

The use of esters of fatty acids creates the greatest versatility to create chemical having the desired milting point temperatures. Esters of fatty acids can be formed by a variety of methods known in the science including alcoholysis and hydrolysis followed by esterification. The advantage of this approach is that relatively pure components having targeted melting point temperatures can be synthesized.

For example, a multitude of esters of oleic acid can be formed by complete esterification with methanol, ethanol, propanol, butanol, isobutanol, pentanol, hexanol, cylcohexanol, phenol, ethylene glycol, glycerin, diethylene glycol, and many more. To a first approximation, the oleate esters formed with each of these esters will result in different melting point temperatures. Furthermore, mixtures of two of the esters have the potential to form mixtures having relatively narrow and useful melting point temperature ranges.

The available fatty acids for reaction are dependent upon the initial triglyceride. The wide variety of components that can and do react with acid groups is not limited to alcohols and includes but is not limited to amines and other nitrogen or sulfur containing compounds. The vast number relatively pure components that can be formed allow PCM chemicals to be produced that are useful at a variety of temperatures. Furthermore, different acids can react with different co-reactants for form chemicals having essentially the same melting point temperatures. Furthermore, mixtures of these products can be used to essentially use the entirety of the naturally occurring fatty acids. Hydrogenation and other chemical modifications can be performed on the fatty acids to, for example, convert oleic acid to stearic acid and thereby limit the chemical diversity of the fatty acids.

SUMMARY OF INVENTION

This invention is a method for producing phase change material (PCM) chemicals containing fatty acids or fatty-acid derivatives. These derivatives (1) are renewable, being produced by biomass or livestock such as cattle, (2) can be manufactured at low to moderate prices, and (3) can be manufactured in a variety of ways to produce PCM chemicals effective at several temperatures of interest in climate control and food maintenance.

The embodiments of this invention reduce the cost and increase yields for the conversion of naturally occurring fats and oils to PCM chemicals.

BRIEF DESCRIPTIONS OF DRAWINGS

FIG. 1. Block flow diagram of process for producing PCM chemicals from fats and oils using reversible reaction and on solid-liquid separation process.

FIG. 2. Block flow diagram of process for producing PCM chemicals from fats and oils using two solid-liquid separation processes.

DETAILS OF PREFERRED EMBODIMENTS

This invention is a method for producing a composition of fatty acid derivatives for use as phase change material (PCM) chemicals and a method of using PCM chemicals. The value of the production method lies in the ability of a simple process to provide high conversions of feed stocks to useful PCM chemicals. The thermal storage ability of these chemicals can be used to both eliminate the need for air conditioning and to shift air conditioning load to non-peak-demand times.

Method of Manufacturing PCM Chemicals from Triglyceride Feed Stocks

FIG. 1 illustrates a preferred method for manufacturing a triglyceride-based PCM chemical. The process consists of mixing a triglyceride that largely solidifies above the temperature of PCM chemical use with a triglyceride that largely solidifies below the temperature of PCM chemical use. After mixing, the mixture is heated to a temperature suitable for transesterification reaction. Subsequent to transesterification, the mixture is cooled and that solid fraction with a suitable melting point temperature is separated as product with the remaining triglyceride returned to the feed for mixing and further reaction. For purposes of terminology in this invention, a triglyceride is a fatty acid glyceride. Solvents improve separation. Solvent is preferable largely recycled internally with makeup solvent added as needed.

Solvents are preferably more volatile than the PCM product. The solvent does not react with the other reactants as compared to a co-reactant that can both react and serve many of the same purposes as a solvent. Common solvents include but are not limited to acetone, volatile ethers, and volatile hydrocarbons. The solvent is preferably removed from the final product by flashing the more-volatile solvent from the product.

To provide high yields of product, the reaction occurring in the reactor of FIG. 1 as well as the reactor of FIG. 2 must be a reversible reaction whereby a reversible reaction is defined as having an equilibrium constant between 0.02 and 50 for reactions where the liquid concentrations in the equilibrium constant cancel to produce a dimensionless equilibrium constant. For reactions where concentrations do not cancel in the equilibrium constant, the reaction is determined to be reversible if, when reactants are reacted in stoichiometric amounts relative to the desired product, the ratio of initial reactant concentration to reaction after the mixture has reacted to equilibrium is between 0.02 and 50. The embodiments of this invention are not limited to specific feed streams to the process. Rather, the embodiments of this invention include a process for the production of phase change material (PCM) chemicals wherein a reactant is reacted in a reaction mixture to yield a PCM chemical, the improvement which comprises the steps of carrying out said reaction in a reactor generating a reactor output stream, cooling said reactor output stream generating a stream containing solid reactor product suspended in liquid reactor product, separating the solid product from the liquid product generating a concentrated solid product and a mostly liquid product, recirculating either the concentrated solid product or the mostly liquid product as a feed to the reactor, and reacting of the recirculated chemical in a reversible reaction.

While the solid-liquid separation processes of FIGS. 1 and 2 are preferred to vapor-liquid separation processes, the embodiments of this invention can be practiced with vapor-liquid separation processes in place of the solid-liquid separation processes of FIGS. 1 and 2.

In the configuration of FIG. 1 the recycled liquid freezes at a lower-than-desired temperature (on a solvent-free basis) and has a relatively high concentration of unsaturated fatty acids derivatives. An oil/fat having a lower unsaturated fatty acid content is added prior to interesterification reaction in an amount of 0.01 to 1.0 times the mass of the recycled fatty acid derivatives and preferably between 0.05 and 0.2. The low concentration of saturated fatty acids substantially limits the amount of high-freezing-point derivatives that are formed with very high yields of the preferred-freezing-point derivatives being formed and frozen out of solution.

Alternative to a solvent that is largely soluble with the PCM product, an anti-solvent that is substantially not soluble with the feed stock may be used. In addition to reducing viscosity, the solvent serves the purpose of displacing liquid fat/oil derivatives from solid fat/oil derivatives during solid-liquid separation processes.

Optionally, a solid-liquid separation may be performed prior to the solid-liquid process that produces product (see FIG. 2); this optional solid-liquid separation process is useful for reaction products in which a fraction of the products melts above the targeted PCM application temperature. Counter-current heat exchange is preferred but optional and applicable by methods known in the science.

Feed stocks other than triglycerides provide an alternative embodiment and additional degrees of freedom to control melting point temperatures of the transesterification products. When feed stocks in addition to triglycerides are used, the process consists of mixing a triglyceride derivative that largely solidifies above the application temperature with a triglyceride derivative that largely solidified below room temperature. After mixing, the mixture is heated to a temperature suitable for reversible reaction. Subsequent to reaction, the mixture is cooled and that solid fraction with a suitable melting point temperature is separated as product with the remaining product returned to the feed for mixing and further reaction. Solvent technology would facilitate separation.

During the reaction processes of FIGS. 1 and 2, irreversible reactions may parallel the reversible reactions. Provided these irreversible reactions are slow relative to the reversible reactions, the irreversible reactions can enhance product quality and/or product yields. Here, slow is defined as having a reactive triglyceride half-life less than 20% of the dominant reversible reactions.

The reactions of FIGS. 1 and 2 are not limited to particular catalysts or temperatures. Heterogeneous catalysts are preferred. When homogeneous catalysts are used, a separation process needs to be performed to remove the homogeneous catalyst from the product. Typically the reaction temperatures will be between 25 and 325° C. The pressure of the reaction may be a function of temperature and can be optimized by methods known in design to maintain a liquid phase. Catalysts and reactions known in the science may be used including but not limited to catalysts promoting transesterification, alcoholysis, inter-esterification, hydrogenation, cis-trans isomerization, and other chemistry of ester bonds including nitrogen, phosphorous, sulfur, and group 1a metal derivatives. Preferred feed stocks include animal fat, soybean oil, palm oil, animal greases, and used cooking oils since these are the most abundant and least costly of fat and oil feed stocks. For example, a preferred feed stock is 60% to 90% (by mass) beef tallow and 10% to 40% soybean oil reacted in a transesterification reaction over 10–20 mesh calcium carbonate catalyst in a packed-bed reactor operated at a temperature between 200 and 280° C. For the process of FIG. 2, the feed stock stream labeled "other" is any chemical that reversibly reacts with the fatty acids of the triglyceride feeds. Examples include methanol, ethanol and diethylene glycol but are not limited to alcohols.

The fractionation processes may be solid-liquid separation processes or vapor-liquid separation processes. Preferably, solid-liquid separation is used. For any given product, the choice of solvent can impact the temperature at which separation is performed. Typically, the solid-liquid separation processes are conducted at temperatures between 10 and 35° C.

The natural fats and oils may be fed to the processes of FIG. 1 or 2 after the reaction or prior to the reaction. If the naturally occurring fat/oil has a higher fraction of product having the desired latent heat properties as compared to the natural fat/oil after reaction, the natural fat/oil is preferably fed to the process after the reaction.

The process of FIG. 1 can be used to produce a variety of fats and acids with an emphasis on ester bond chemistry. The preferred PCM chemicals of this process are comprised mostly of triglycerides since these triglycerides provide the largest variety of chemical species with the largest number of chemical species falling within the targeted PCM chemical temperature range.

For use in building climate control, compositions of these chemicals are preferably >50% triglycerides with >10% but <50% of the fatty acid content of said triglycerides being saturated fatty acids. More preferably, >70% triglycerides with >20% but <40% of the fatty acid content of said triglycerides being saturated fatty acids.

For triglycerides or esters terminating in alkyl groups, emulsions can be formed with water. The formation of stable emulsions with water can be used in PCM device applications were fire-retardant materials are desired.

Preferred Means to use Charged PCM Chemicals

PCM chemicals are considered charged when they are frozen if the intended use is to cool the contents of a house and when they are unfrozen when the intended use is to heat a house. The preferred method to use PCM chemicals is to charge the chemical and consume the charge in 24-hour cycles.

The preferred means to use a PCM chemical is in an isolated form where heat transfers through the isolating surface to air. This surface prevents odors, oxidation, and biological growth in the PCM chemical.

For air-cooling operations the preferred method consists of having air contact the encapsulated PCM chemicals prior to contacting the evaporator coils of an air conditioning system by locating the evaporator coils downstream from the PCM device. The evaporator coils of the air conditioning system are only operated when additional cooling is needed beyond that supplied by the PCM chemicals. The preferred method to determine if additional cooling is need by the coils is to use a two-temperature control system—one temperature higher than the other. When inside air temperature rises above the lower temperature set point, inside air flow is directed next to the encapsulated PCM chemicals with the evaporator coils not operational. When the inside air temperature rises above the higher set point temperature, the evaporator coils are activated to provide additional cooling.

For heating operations the preferred method consists of having air contact the encapsulated PCM chemicals prior to contacting the auxiliary heating means. Auxiliary heating means include but are not limited to heat pumps and furnaces. The auxiliary heating means is only operated when additional heating is needed. The preferred method to determine if additional heating is need by the coils is to use a two-temperature control system—one temperature higher than the other. When inside air temperature falls below the higher temperature set point, inside air flow is directed next to the encapsulated PCM chemicals with the auxiliary heating means not operational. When the inside air temperature falls below the lower set point temperature, the auxiliary heating means is activated to provide additional heating.

One skilled in the art could readily set up the control system described in the previous two paragraphs.

Preferred Means to Charge PCM Chemicals

PCM chemicals are charged during the night when the PCM chemicals are used to provide cooling. The chemicals are charged during the day when providing heating.

For typical building cooling applications, two sources are available to directly or indirectly charge PCM chemicals: (1) use of outside air or (2) use of a chiller (normally a vapor-compression air conditioner). When the outside air has a wet-bulb temperature that is less than approximately 5° F. lower than the desired indoor air temperature, the use of outside air is preferred to use of a chiller. Preferably, the outside air is contacted with water to cool the air to its wet-bulb temperature. Unlike direct use of evaporative cooling in a building, when cooling PCM devices, maximum cooling of ambient air is preferably achieved by cooling the outside air to 100% relative humidity (i.e. the wet-bulb temperature of the ambient air). When outside air cannot be sufficiently cooled, evaporatively cooled air is further cooled with a chiller prior to use in cooling the PCM devices. When the wet-bulb temperature of the outside air is warmer than about 5° F. less than the set point temperature in the building, the chiller is preferably used without supplemental cooling from evaporatively cooled outside air.

For this method of recharging the encapsulated PCM chemical used to cool a building, water that accumulated in the system is drained from the system, contacting of the said air with water is terminated by terminating the water supply for at least 8 consecutive hours for each 24 hours of system utilization, and all surfaces contacted by the said air are present without water on the said surfaces for at least 6 consecutive hours for each 24 hours of system utilization.

Method and Embodiment for Using PCM Chemicals

The preferred means of using PCMs for moderating climates in a building consists of an apparatus with the following features:

1. A device containing PCM chemical with at least one surface over which air can travel with a heat flux through the surface to or from the PCM chemical,
2. A means of connecting the said device with air external to the building,
3. A fan or other means for conveying air from outside the building, across the said surface to charge the PCM chemicals, and then back to outside the building,
4. A control means that uses external air temperature or time of day to start and stop flow of air across the PCM, and
5. A surface and air-flow means through which heat is transferred from air inside the building to the PCM chemical to provide cooling for the building, or alternatively, through which heat is transferred from the PCM chemical to the air inside the building to provide heating.

The surface that separates the PCM chemical from air preferably totally encapsulates the PCM chemical, said surface preferably being a plastic or metal. The encapsulated PCM devices are preferably contained in a tank through which air flows therein contacting the outside surfaces of the PCM devices. In the preferred embodiment the means of connecting the said tank with air external to the building is an air duct.

In the preferred embodiment operated in an air conditioning mode, the first step (charging step) of the method of operation includes directing air from outside the building through a first duct to the PCM device then over the PCM heat exchange surface(s) and then through a second duct and back outside the building. The location of the said fan or other means for conveying air is preferably next to or in one of the ducts. This first step is preferably performed at night when the external temperature is below the temperature at which the PCM chemical undergoes a phase transition. The temperature for the latent heat transformation is preferably between 50 and 100 F. For summer cooling, said temperatures are more preferably between 65 and 75 F and most preferably between 68 and 73 F. A second step of the method of operation includes directing air from inside the building through a duct to the PCM device then over the PCM heat exchange surface(s) and then through a different duct and back inside the building. Optionally, an auxiliary cooling means is located downstream of the PCM device. This second step is preferably performed when the temperature of air in the building is above the temperature at which the PCM undergoes a process through which it absorbs a significant latent heat.

The use of evaporative cooling during the night and not during the day has the distinct advantage of allowing the equipment to undergo a drying cycle during the day. This drying cycle will substantially prevent fungal and other growth on the equipment. When possible, the equipment undergoing drying is preferably placed in direct sunlight to facilitate drying and to allow radiation to also inhibit fungal growth. Methods of water introduction are known and practiced in the science and art of water coolers (also called evaporative coolers or swamp coolers).

For air conditioning, preferably at least part of the air-flow patterns includes the first step during the cooler nighttime hours and the second step during the warmer daytime hours. Wet-bulb temperatures are lower at nighttime and provide a better driving force for cooling the house. The system that uses the coolest web-bulb temperatures within a 24 hour period to chill the PCM chemicals is referred to as the PCM-LW24 system.

Optionally, during the cooler nighttime hours, evaporatively cooled external air can be used to freeze the PCM chemical during the night followed by using the PCM to chill external air that is not evaporatively cooled and is subsequently put inside the building. To prevent accumulation of air in the building, a means is needed to vent warmer air from inside the building as it is displaced by cooled air being conveyed into the building.

For heating during the winter, the preferred embodiment has a third step of the method of operation directing air from outside the building through a first duct to the PCM device then over the PCM heat exchange surface(s) and then through a second duct and back outside the building. This first step preferably performed during the day when the external temperature is above the temperature at which the PCM undergoes a process through which it releases a significant latent heat. The temperature for the latent heat transformation is preferably between 60 and 100 F, more preferably between 75 and 85 F and most preferably between 77 and 83 F. A fourth step of the method of operation includes directing air from inside the building through a duct to the PCM device then over the PCM heat exchange surface(s) and then through a different duct and back inside the building. This fourth step is preferably performed when the temperature of air in the building is below the temperature at which the PCM undergoes a phase transition.

When used in combination with a heat pump (for heating the building), the PCM provides a higher temperature heat sink than is possible during the nighttime. In this embodiment, heat is removed from the PCM chemical during the nighttime and pumped into the house. Alternatively, heat can be taken from outside air during the day with a heat pump and stored in a higher-temperature PCM.

Maintenance costs associated with organism growth on the contact elements of evaporative coolers can be substantial. To reduce or eliminate these costs, the preferred method of using evaporative coolers with PCM devices is to keep the evaporative coolers dry and warm during substantial parts of the day. Warm is preferably >80 F therein inhibiting bacterial growth—such modes of operation can diminish performance of evaporative coolers used in conventional applications but do not diminish performances of the embodiments of this invention. To further inhibit growth of organisms the evaporative cooler is preferable directly exposed to sunlight and respective ultraviolet radiation with designs the maximize the effectiveness of this exposure to minimize organism growth.

The preferred means for evaporatively cooling the air is to spray a fine mist of water into the air followed by flow through a demisting pad. After the demisting pad, the water that does not evaporate accumulates and leaves by a water drain. The system is designed to allow no water to accumulate and for the system to be entirely dried each 24 hour cycle with the exception of water located at least six inches down the drain pipe.

Combinations with Air Cycle

As an alternative to the conventional vapor-compression chiller to enhance cooling, an open air-cycle refrigerator is well-suited to supplement cooling for PCM devices. When wet-bulb temperatures are too high and/or moisture should be removed from interior air to meet comfort standards, the PCM-LW24 system needs to be enhanced with an auxiliary air conditioning system. One embodiment of this invention uses an air cycle to enhance the capabilities of the PCM-LW24 system. The air cycle is used to either chill nighttime air to lower temperatures and assist cooling of the PCM, or alternatively, the air cycle is used to lower the temperature of the air by expansion after the air contacts PCM device during daytime cooling of interior air.

The preferred air cycle (also referred to as reverse Brayton cycle) includes an embodiment that can route/duct air differently, depending upon the purpose of the interaction between the air cycle and the PCM-LW24 system. To assist nighttime air in cooling the PCM, the following procedure is preferred: (1) outside air is routed to an expander that expands air to a lower pressure with associated cooling, (2) the expanded air is routed to and contacts the PCM devices, (3) after cooling the PCM devices, the warmed air is routed to a compressor that compresses the air to ambient pressure, and (4) the ambient pressure air is released to the outside. The expansion work is used to power the compressor. This method has utility for cooling the PCM chemicals when the outside nighttime air is too warm to perform this otherwise.

Preferred pressure ratios for expansion are 0.98 to 0.7 and most preferably between 0.98 and 0.85. Preferably, the pressure ratio of the reverse Brayton cycle is variable with preferred pressure ratios identified to optimize overall coefficients of performance. The preferred PCM devices are encapsulated PCM placed in a vessel that can handle the low pressures. The size of the encapsulated PCM devices can be identified by methods known in the art.

The reverse Brayton cycle operated in this method where the air is at less than atmospheric pressure when contacting the PCM device has a non-obvious advantage in that all the cooling provided by expansion results in additional cooling. In the conventional reverse Brayton cycle, some of the cooling is lost as the driving force temperature difference needed for heat transfer. This advantage substantially increases the efficiency of this cycle.

Preferably the same compressors and expanders are also capable of moving air for circulation, for chilling the PCM, and for chilling air beyond the capabilities of the PCM.

To assist the cooling capabilities of the PCM during the daytime, the following procedure is preferred: (1) inside air is routed to the compressor that compresses air to a higher pressure with associated warming, (2) the compressed air is routed to and contacts the PCM devices, (3) after the air is cooled by the PCM devices, the cooled air is routed to the expander that expands the air to ambient pressure with associated further chilling, and (4) the ambient pressure air is released to the outside. Preferably the expansion work is used, in part, to power the compressor. This method has utility for cooling the inside air when additional cooling is needed than can be required by the PCM devices. Methods known in the art will allow condensed water to be removed from the PCM devices.

The preferred configuration for the reverse Brayton cycle heating and cooling consists of 1) a PCM surface heat exchange area, 2) a large expander, 3) a large compressor connect to the large expander, and 4) a driving compressor powered by auxiliary means. The heat exchange area is at a higher pressure when providing heating and at a lower pressure when providing cooling. The only power applied to the system for heating or cooling purposes is to the driving compressor. The simple design of the large expander/compressor leads to low cost and high efficiency. The driving compressor/expander could be in parallel or series with the large compressors/expanders and is preferably connected in parallel.

During operation of the reverse Brayton cycle as a cooler, outside air first enters the expander expanding to a lower pressure. During expansion, shaft work from the expander physically drives the compressor. The expanded air is cooled proportionally to the shaft work transferred from the expander to the compressor. The cooled air next contacts the PCM devices therein cooling the PCM devices. In the preferred embodiment, most of the air is then compressed by the large compressor to atmospheric pressure and released. The air not compressed by the large compressor is compressed by the driving compressor and released. To both increase flow through the cycle and provide greater cooling, the volume of air sent through the driving compressor is increased by increasing the speed of the driving compressor.

During operation of the cycle as a heater, outside air first enters the compressor compressing to a higher pressure. Shaft work compression is provided by physical connection to the larger expander. The compressed air is heated proportionally to the shaft work transferred from the expander to the compressor. The heated air next contacts the PCM devices therein heating the PCM devices. In the preferred embodiment, the air is then expanded by the large expander to atmospheric pressure and released. The air not compressed by the large compressor is compressed by the driving compressor and diverted into the containing of PCM devices. To both increase flow through the cycle and provide greater heating, the volume of air sent through the driving compressor is increased by increasing the speed of the driving compressor.

Independent of the PCM chemical application, an evaporative cooler can be used in combination with a vapor-compression air conditioning system to provide the needed cooling. Unless humidity levels are extremely high, evaporative coolers can be used in place of vapor-compression cycles for much of the air conditioning needs. Preferred methods of operation use an evaporative cooler at all times when the cooler provides sufficient cooling. For most locations that require vapor compression cycle air conditioners this translates to using the vapor compression cycle with the evaporative cooler in insufficient to meet cooling standards.

Combinations with Adsorption (or Absorption) Cycle

One embodiment of this invention uses an adsorption or absorption system to enhance the capabilities of the PCM-LW24 system. In this embodiment, air is contacted with a material capable of removing moisture from the air (adsorbent or absorbent). As a result of removing moisture from the air, the temperature of the air is increased. The warmer air is then contacted with the PCM devices to cool the air. The air can either be directly circulated back into the house, or water can be sprayed into the air producing evaporative cooling to further chill the air prior to circulation back into the house.

When used to remove moisture for air to be released into the house, this process can be used at night or day. Methods known in the science can be used to remove the moisture from the adsorbent or absorbent. In some instances, the warm daytime air is sufficient to remove the moisture from the adsorbent/absorbent. In other instance, heat must be supplied to air that is used to regenerate the adsorbent/absorbent. Preferably, if hot air is produced to regenerate the adsorbent/absorbent, the hot air is used to heat water in a hot water heater. Regeneration of adsorbent/absorbent can be timed to coincide with needs to generate hot water in the hot water heater.

The most preferred embodiment of this invention is the PCM-LW24 system enhanced with adsorption (or absorption) to remove water from air and where the heat produced during the regeneration of adsorbent/absorbent is used to heat water in a hot water heater.

I claim:

1. In a process for the production of phase change material (PCM) chemicals wherein a reactant is reacted in a reaction mixture to yield a PCM chemical, the improvement which comprises the steps of carrying out said reaction in a reactor generating a reactor output stream, cooling said reactor output stream generating a stream containing solid reactor product suspended in liquid reactor product, separating the solid product from the liquid product generating a concentrated solid product and a mostly liquid product, recirculating either the concentrated solid product or the mostly liquid product as a recirculated chemical, and reacting the recirculated chemical in a reversible reaction.

2. The process of claim 1, wherein said reactant is a fatty acid glyceride.

3. The process of claim 2, said fatty acid glyceride selected from the group consisting of oils or fats derived from soybean, palm, coconut, sunflower, rapeseed, cottonseed, linseed, caster, peanut, olive, safflower, evening primrose, borage, carboseed, animal tallows and fats, animal greases, and mixtures thereof.

4. The process of claim 3, wherein the reaction mixture is a mixture of fatty acid glycerides that have different melting points and the reaction is an interesterification reaction.

5. The process of claim 4, wherein the reaction mixture is a mixture of fatty acid glycerides and simple alcohols and the reaction is an alcoholysis reaction.

6. The process of claim 1, wherein the solid-liquid separation is conducted at a temperature between 10° C. and 30° C.

7. The process of claim 1, wherein the reversible reaction is conducted at a temperature between 25° C. and 325° C. and the equilibrium constant for the reaction is between 0.05 and 20.

8. In a process for the production of PCM chemicals wherein a reactant is reacted in a reaction mixture to yield a PCM chemical, the improvement which comprises the steps of carrying out said reaction in a reactor generating a reactor output stream, separating said reactor output stream generating a stream containing vapor reactor product and liquid reactor product, recirculating either the vapor or liquid product as a recirculated chemical, and reacting the recirculated chemical in a reversible reaction.

9. The process of claim 8, wherein said reactant is a fatty acid glyceride.

10. The process of claim 9, said fatty acid glyceride selected from the group consisting of oils or fats derived from soybean, palm, coconut, sunflower, rapeseed, cottonseed, linseed, caster, peanut, olive, safflower, evening primrose, borage, carboseed, animal tallows and fats, animal greases, and mixtures thereof.

11. The process of claim 10, wherein the reaction mixture is a mixture of fatty acid glycerides that have different melting points and the reaction is an interesterification reaction.

12. The process of claim 9, wherein the reaction mixture includes hydrogen and the reaction is hydrogenation.

13. The process of claim 8, wherein the reaction mixture is a mixture of fatty acid glycerides and simple alcohols and the reaction is an alcoholysis reaction.

14. In a method for using PCM chemical to cool a building wherein the PCM chemical is encapsulated to allow heat transfer to air without contacting the said air which includes a process for cooling the PCM chemical that comprises the steps of directing said air from a location outside the building through a duct followed by, contacting said air with water to saturate the air with water followed by, demisting of the water droplets in the air through a demisting device followed by, contacting the water-saturated air with the surfaces encapsulating the PCM chemical followed by, release of the air outside the building whereby, the water that accumulated at the demisting device is drained from the system, contacting of the said air with water is terminated by terminating the water supply for at least 8 consecutive hours for each 24 hours of system utilization, and all surfaces contacted by the said air are present without water on the said surfaces for at least 6 consecutive hours for each 24 hours of system utilization.

* * * * *